(12) United States Patent
Takeshita et al.

(10) Patent No.: US 10,349,793 B2
(45) Date of Patent: Jul. 16, 2019

(54) TOILET APPARATUS

(71) Applicant: TOTO LTD., Kitakyushu-shi, Fukuoka (JP)

(72) Inventors: Megumi Takeshita, Kitakyushu (JP); Mihoko Sato, Kitakyushu (JP); Tomomi Rokuta, Kitakyushu (JP); Akihiro Ashihara, Kitakyushu (JP); Ayaka Shigeta, Kitakyushu (JP); Minoru Tani, Kitakyushu (JP); Hirotaka Nakabayashi, Kitakyushu (JP); Tomohiro Miyazaki, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 15/675,960

(22) Filed: Aug. 14, 2017

(65) Prior Publication Data

US 2018/0049607 A1 Feb. 22, 2018

(30) Foreign Application Priority Data

Aug. 17, 2016 (JP) .................................. 2016-159953

(51) Int. Cl.
  *G01S 17/02* (2006.01)
  *A47K 13/30* (2006.01)
  *A47K 13/04* (2006.01)
  *A47K 13/00* (2006.01)

(52) U.S. Cl.
  CPC ............ *A47K 13/305* (2013.01); *A47K 13/04* (2013.01); *A47K 13/30* (2013.01); *A47K 13/00* (2013.01); *G01S 17/026* (2013.01)

(58) Field of Classification Search
  CPC .............................. A47K 13/305; A47K 13/00

USPC ........................................ 4/420.1–420.5, 234
See application file for complete search history.

(56) References Cited

U.S. PATENT DOCUMENTS

2009/0217447 A1 9/2009 Matsushita
2012/0005817 A1* 1/2012 Jeong .................... C02F 1/4674
  4/420.4

FOREIGN PATENT DOCUMENTS

CN 205348335 U 6/2016
TW I531348 B 5/2016
WO 2011/092877 A1 8/2011

OTHER PUBLICATIONS

English translation of JP 2006-158596, published on Jun. 22, 2006 in the name of TOTO LTD.

* cited by examiner

*Primary Examiner* — Christine J Skubinna
(74) *Attorney, Agent, or Firm* — Pearne & Gordon LLP

(57) ABSTRACT

The toilet apparatus includes a main part and a toilet seat. The main part includes a case cover covering a function part and is attached on a toilet bowl. The toilet seat is attached rotatably to the case cover, and shifts between a closed state and an open state. The case cover includes an extending portion. A height becomes low toward forward. The toilet seat includes a toilet seat main body and a heating part. The toilet seat main body includes a first portion and a second portion. The first portion is positioned in front of the case cover in the closed state. The second portion rises backward from the first portion in the closed state, and overlaps the extending portion. An upper end surface of the extending portion changes to lower a height toward forward and to lower a height toward a side.

5 Claims, 13 Drawing Sheets

TOILET APPARATUS

CROSS-REFERENCE TO RELATED APPLICATIONS

This application is based upon and claims the benefit of priority from Japanese Patent Application No. 2016-159953, filed on Aug. 17, 2016; the entire contents of which are incorporated herein by reference.

FIELD

Embodiments described herein relate generally to a toilet apparatus.

BACKGROUND

There has been a toilet apparatus including a main part and a toilet seat rotatably attached to the main part (e.g. JP 2011-216 A (Kokai)). In the toilet apparatus, a heating part is incorporated in the toilet seat and a seating surface of the toilet seat is warmed.

A gap is provided between the main part and the toilet seat in order to suppress extreme application of force to the main part in association with seating of a user. The gap extends along a upper end surface of the main part and a lower end surface of the toilet seat, and is formed linearly from one side end surface toward other side end surface of the toilet seat and the main part. When viewing the main part and the toilet seat from the side, it is possible to see the opposite side through the gap. Therefore, cold air easily enters the gap and the temperature of the seating surface may be decreased when warming the seating surface by the heating part.

SUMMARY

According to an aspect of the invention, there is provided a toilet apparatus. The toilet apparatus includes a main part and a toilet seat. The main part includes a function part, and a case cover covering the function part. The main part is attached on a toilet bowl. The toilet seat is attached rotatably to the case cover. The toilet seat shifts between a closed state and an open state. In the closed state, a user is capable of seating upward the toilet bowl. In the open state, an upper surface of the toilet bowl is exposed. The case cover includes an extending portion. A height of the extending portion becomes low toward forward. The toilet seat includes a toilet seat main body and a heating part. The toilet seat main body includes a first portion and a second portion. The first portion is positioned forward the case cover in the closed state. The second portion rises backward from the first portion in the closed state, overlaps the extending portion, and is pivotally supported to the case cover. The heating part is incorporated in the toilet seat main body, and heats a seating surface of the toilet seat main body. An upper end surface of the extending portion changes to lower a height toward forward and to lower a height toward a side. A lower end surface of the second portion of the toilet seat main body changes along the upper end surface of the extending portion to lower a height toward the side in the closed state.

DETAILED DESCRIPTION

Figure 1:
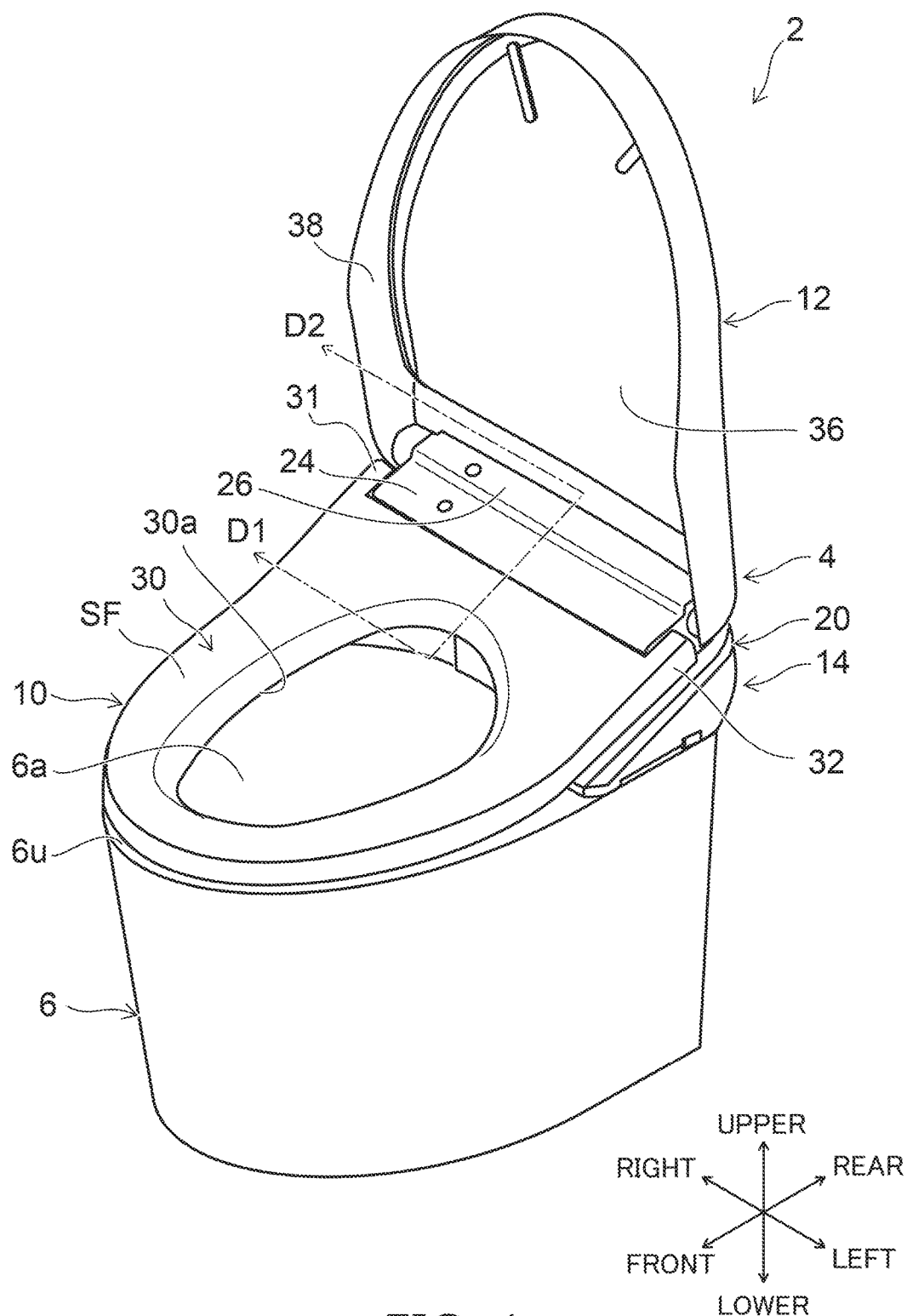
FIG. 1 is a perspective view showing a toilet apparatus according to an embodiment.

The first invention is a toilet apparatus. The toilet apparatus includes a main part and a toilet seat. The main part includes a function part, and a case cover covering the function part. The main part is attached on a toilet bowl. The toilet seat is attached rotatably to the case cover. The toilet seat shifts between a closed state and an open state. In the closed state, a user is capable of seating upward the toilet bowl. In the open state, an upper surface of the toilet bowl is exposed. The case cover includes an extending portion. A height of the extending portion becomes low toward forward. The toilet seat includes a toilet seat main body and a heating part. The toilet seat main body includes a first portion and a second portion. The first portion is positioned forward the case cover in the closed state. The second portion rises backward from the first portion in the closed state, overlaps the extending portion, and is pivotally supported to the case cover. The heating part is incorporated in the toilet seat main body, and heats a seating surface of the toilet seat main body. An upper end surface of the extending portion changes to lower a height toward forward and to lower a height toward a side. A lower end surface of the second portion of the toilet seat main body changes along the upper end surface of the extending portion to lower a height toward the side in the closed state.

According to the toilet apparatus, even if cold air enters between the lower end surface of the toilet seat main body and the upper end surface of the extending portion, the cold air tends to go down downward, and thus the cold air can be easily exhausted to the outside along the slope of the lower end surface of the toilet seat main body and the upper end surface of the extending portion. Therefore, when the seating surface is heated, the temperature of the seating surface can be suppressed from decreasing. The toilet apparatus having the temperature of the seating surface suppressed from decreasing can be provided. The noise and scratch due to contact between the case cover and the toilet seat can be suppressed as well.

The second invention is the toilet apparatus of the first invention. The upper end surface of the extending portion has a convex curved surface shape. The lower end surface of the second portion of the toilet seat main body has a concave curved surface shape, and a curvature of the lower end surface of the second portion at a prescribed position is generally same as a curvature of the upper end surface of the extending portion at a position opposing the prescribed position in the closed state.

According to the toilet apparatus, the cold air which enters between the lower end surface of the toilet seat main body and the upper end surface of the extending portion can be more easily exhausted to the outside. The temperature of the seating surface can be suppressed more from decreasing.

Third invention is the toilet apparatus of the first invention or the second invention. In a cross-section orthogonal to a front-back direction, a lowest point of the lower end surface of the toilet seat in the closed state is positioned downward a highest point of the upper end surface of the extending portion.

According to the toilet apparatus, the cold air can be suppressed from entering between the lower end surface of the toilet seat main body and the upper end surface of the extending portion. The temperature of the seating surface can be suppressed more from decreasing. When viewing the main part and the toilet seat from the side, the gap is not seen and the design of the toilet apparatus can be improved.

The fourth invention is the toilet apparatus in one of the first to third inventions. A change ratio of a height of a center portion of the upper end surface of the extending portion is smaller than a curvature of a height of a side end portion of the upper end surface of the extending portion, and a change ratio of a height of a center portion of the lower end surface of the second portion of the toilet seat main body is smaller than a curvature of a height of a side end portion of the lower end surface of the second portion.

According to the toilet apparatus, compared with the case where the lower end surface of the toilet seat main body changes at the same change ratio from the side end portion to the center portion, the side face portion of the toilet seat which needs strength can be reinforced, and the center portion of the toilet seat which does not need much strength can be thinned. Therefore, while suppressing the temperature of the seating surface from decreasing, the toilet apparatus can be suppressed from increasing in size.

Various embodiments will be described hereinafter with reference to the accompanying drawings. In the figures, the same reference numbers are applied to the same constitutional elements, and detailed description will not be repeated as appropriate.

Figure 2:
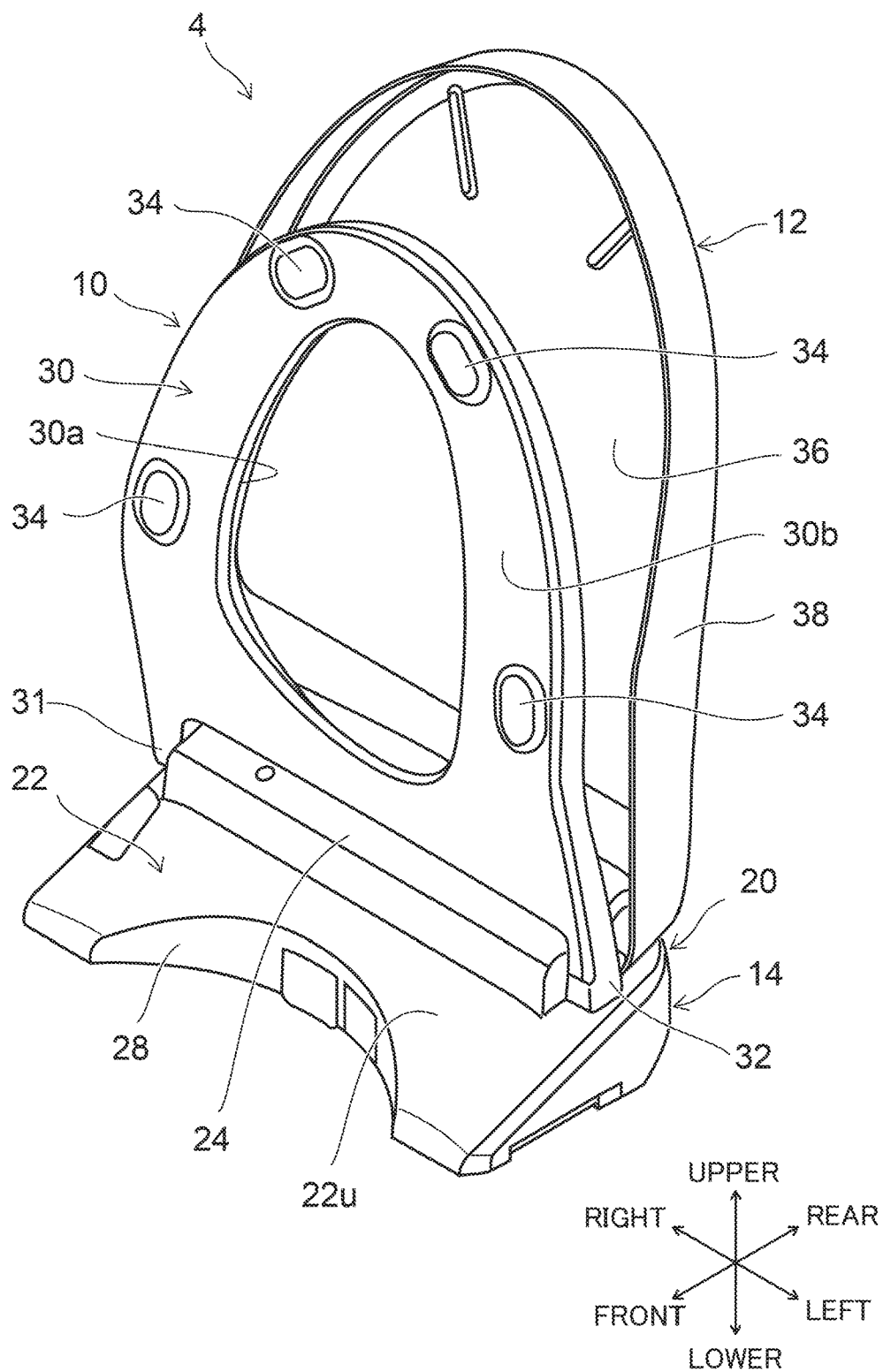
FIG. 2 is a perspective view showing the toilet apparatus according to the embodiment.
Figure 3:
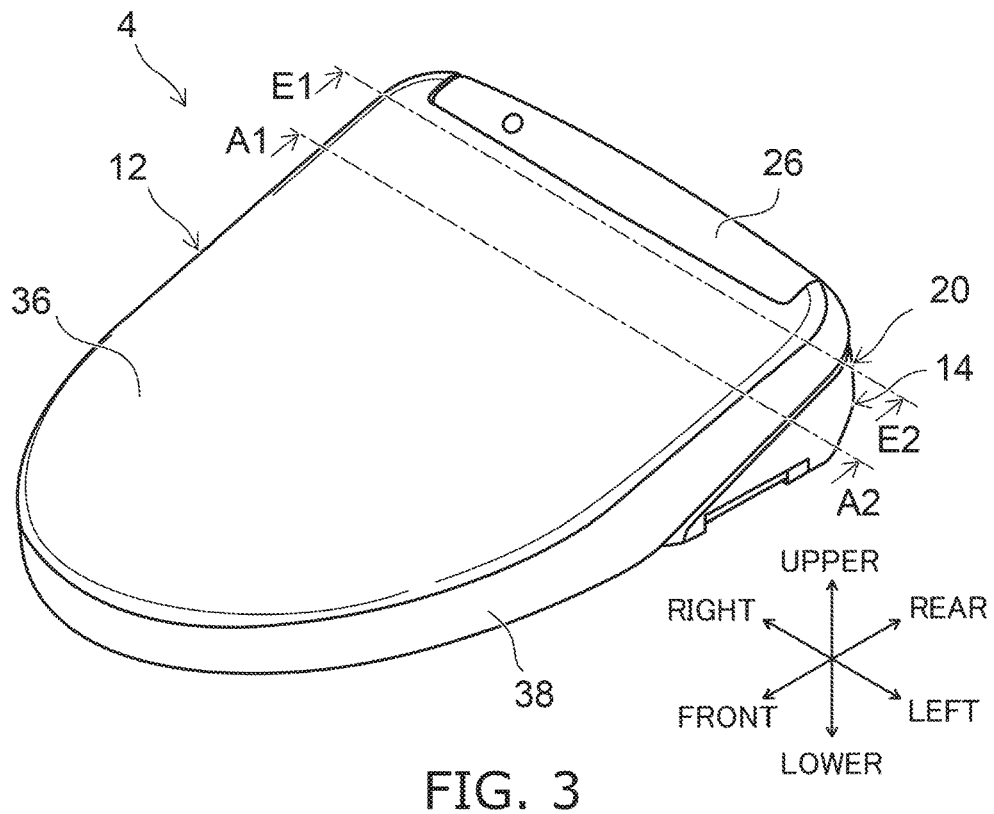
FIG. 3 is a perspective view showing the toilet apparatus according to the embodiment.

FIG. 1 to FIG. 3 are perspective views showing a toilet apparatus according to the embodiment.

As shown in FIG. 1 to FIG. 3, a toilet apparatus 2 includes a toilet seat device 4, and a western-style sit-down toilet bowl (hereinafter, for convenience of the description, simply referred to as "toilet bowl") 6. The toilet seat device 4 is attached on the toilet bowl 6. The toilet seat device 4 may be attached integrally to the toilet bowl 6 and may be detachably attached to the toilet bowl 6. The toilet bowl 6 is provided to the toilet apparatus 2 as necessary, and can be omitted. In FIG. 2 and FIG. 3, the toilet bowl 6 is not shown conveniently.

The toilet seat device 4 includes a toilet seat 10, a toilet lid 12, and a main part 14. The toilet lid 12 is provided to the toilet seat device 4 as necessary, and can be omitted. The toilet seat 10 and the toilet lid 12 are pivotally supported rotatably to the main part 14.

In the specification of the application, as viewed from the user sitting on the toilet seat 10, the upper side is defined as "upward", and as viewed from the user sitting on the toilet seat 10, the lower side is defined as "downward". As viewed from the user sitting on the toilet seat 10 with the back facing the toilet lid 12 in an open state, the front side is defined as "forward", the rear side is defined as "backward", the right side is defined as "right lateral", and the left side is defined as "left lateral".

The toilet bowl 6 includes a bowl portion 6a. The bowl portion 6a is concave downward. The toilet bowl 6 receives body waste such as urine and feces of the user in the bowl portion 6a.

The main part 14 of the toilet seat device 4 is attached on a portion backward the bowl portion 6a of the toilet bowl 6. The main part 14 includes a case cover 20. The main part 14 pivotally supports rotatably the toilet seat 10 and the toilet lid 12 on the case cover 20.

The case cover 20 includes an extending portion 22, a toilet seat pivot support portion 24, and a toilet lid pivot support portion 26. The extending portion 22 has a height lowering toward forward. The extending portion 22 is descending and inclined continuously toward forward. The extending portion 22 has a curved concave surface 28. The curved concave surface 28 is provided at the center portion of the extending portion 22 in a horizontal direction, and is curved in a concave configuration along a shape of an open edge of the bowl portion 6a.

The toilet seat pivot support portion 24 is provided backward the extending portion 22 and pivotally supports the toilet seat 10. The toilet lid pivot support portion 26 is provided backward the toilet seat pivot support portion 24 and pivotally supports the toilet lid 12.

The toilet seat 10 is attached rotatably to the case cover 20 and shifts between the closed state and the open state. The closed state of the toilet seat 10 is a state in which a user is capable of seating upward the toilet bowl 6 (state shown in FIG. 1). The open state of the toilet seat 10 is a state in which an upper surface 6u of the toilet bowl 6 is exposed (state shown in FIG. 2).

The toilet seat 10 includes a toilet seat main body 30, a pair of hinge portions 31, 32, and a buffer member 34. The toilet seat main body 30 has an opening 30a exposing the bowl portion 6a. The toilet seat main body 30 is provided on the toilet bowl 6 so as to surround an outer edge of the bowl portion 6a in the closed state, and exposes the bowl portion 6a via the opening 30a. Thereby, the user can evacuate to the bowl portion 6a in a sitting state on the toilet seat 10. This example shows the so called O-type toilet seat main body 30 having a through hole-shaped opening 30a formed. The toilet seat main body 30 is not limited to the O-type and may be a U-type or the like. The opening 30a is not limited to be through hole-shaped, and may be notch-shaped. A shape viewed from upward of the toilet seat main body 30 in a use state (a state in which the user is capable of seating) is annular or U-shaped.

The hinge portions 31, 32 are provided on a rear end of the toilet seat main body 30. The toilet seat main body 30 is pivotally supported rotatably to the toilet seat pivot support portion 24 of the case cover 20 via the hinge portions 31, 31. The hinge portion 31 is provided at a right end of the rear end of the toilet seat main body 30. The hinge portion 32 is provided at a left end of the rear end of the toilet seat main body 30. The toilet seat main body 30 is pivotally supported rotatably to the case cover 20 via the hinge portions 31, 32 by interposing the toilet seat pivot support portion 24 with the hinge portions 31, 32.

The buffer member 34 is provided on a lower end surface 30b of the toilet seat main body 30. The buffer member 34 includes, for example, an elastic material such as gum. The buffer member 34 abuts, for example, the upper surface 6u of the toilet bowl 6 in the closes state, and supports the toilet seat main body 30. This can suppress scratches and breakages or the like of the toilet bowl 6 and the toilet seat main body 30. The buffer member 34 is provided multiply on the lower end surface 30b. The number of the buffer members 34 may be arbitrary, and may be one.

The toilet lid 12 is attached rotatably to the toilet lid pivot support portion 26 of the case cover 20, and shifts between the closed state covering the toilet seat 10 (state shown in FIG. 3) and the open state exposing the toilet seat 10 (state shown in FIG. 1 and FIG. 2). The toilet lid 12 covers the toilet seat 10 and the bowl portion 6a of the toilet bowl 6 in the closed state.

The toilet lid 12 includes a lid main body 36 and a hanging portion 38. The lid main body 36 covers upward the toilet seat 10 in the closed state. The hanging portion 38 hangs from an outer edge of the lid main body 36, and covers the side of the toilet seat 10 in the closed state.

Figure 4:
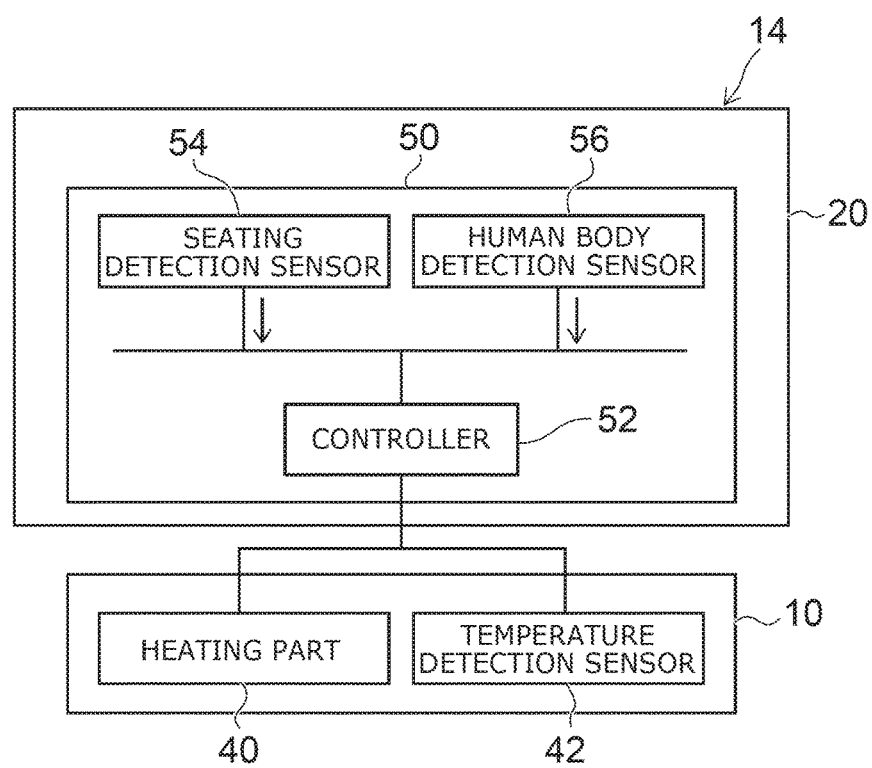
FIG. 4 is a block diagram showing the toilet apparatus according to the embodiment.

FIG. 4 is a block diagram showing the toilet apparatus according to the embodiment.

As shown in FIG. 4, the toilet seat 10 incorporates a heating part 40, and a temperature detection sensor 42. The heating part 40 is provided inside the toilet seat 10. The heating part 40 heats a seating surface (a surface being contact with a bottom of the user) SF from the inside by generating heat in response to energization. The heating part 40 is a so called heater. For example, a resistance heating technique and an induction heating technique for heating by electromagnetic induction or the like are used for the heating part 40.

The temperature detection sensor 42 detects, for example, the temperature of the seating surface SF of the toilet seat 10. The temperature of the seating surface SF may be detected directly by the temperature detection sensor 42, and may be determined by calculation based on output of the temperature detection sensor 42.

The main part 14 includes a function part 50. The function part 50 includes, for example, a controller 52, a seating detection sensor 54, and a human body detection sensor 56. The function part 50 is accommodated in an internal space of the case cover 20. That is, the case cover 20 covers the function part 50.

The seating detection sensor 54 is capable of detecting a human body existing upward the toilet seat 10 just before the user seats on the toilet seat 10, and the user seating on the toilet seat 10. The seating detection sensor 54 may detect not only the user seating on the toilet seat 10 but also the user existing above the toilet seat 10. An infrared transmit/receive range sensor can be used for the seating detection sensor 54 like this, for example. The seating detection sensor 54 may be a switch turning ON/OFF based on a load when the user seats. The seating detection sensor 54 outputs a signal indicating detection of seating in response to detection of user seating.

The human body detection sensor 56 detects the user forward the toilet bowl 6, that is, the user existing at a position separated forward from the toilet seat 10. In other words, the human body detection sensor 56 detects the user who enters a toilet room to approach the toilet seat 10. The infrared transmit/receive range sensor can be used for the human body detection sensor 56 like this, for example. The human body detection sensor 56 outputs a signal indicating detection of the human body in response to detection of the human body.

The controller 52 is connected to the seating detection sensor 54 and the human body detection sensor 56, and connected to the heating part 40 of the toilet seat 10 and the temperature detection sensor 42. The controller 52 controls energization quantity to the heating part 40 on the basis of a detection signal from the temperature detection sensor 42.

The controller 52 performs an immediate warm operation mode which increases the seating surface SF to a suitable temperature, for example, by stopping the energization to the heating part 40 or reducing the energization quantity when not in use to set the seating surface SF of the toilet seat 10 to a lower temperature, and by increasing the energization quantity to the heating part 40 when using to heat rapidly the seating surface SF of the toilet seat 10.

The controller 52 performs detection of the user based on the detection result of the human body detection sensor 56 in a stand-by state in which the energization quantity to the heating part 40 is suppressed. When the human body is detected by the human body detection sensor 56, the controller 52 increases the energization quantity to the heating part 40, and heats the temperature of the seating surface SF of the toilet seat 10 to the predetermined preset temperature.

At this time, a time from the detection of the user by the human body detection sensor 56 to the seating of the user on the toilet seat 10 is determined previously by statics. The controller completes heating to the preset temperature within a time shorter than this time. This can suppress the user from seating on the toilet seat 10 while the temperature of the seating surface SF is low. It is possible to suppress the user from experiencing rapid heating from the temperature in the stand-by state to the preset temperature.

The controller 52 determines whether the temperature of the seating surface SF increases to the preset temperature or not, for example, on the basis of the detection results of the temperature detection sensor 42. When increase to the preset temperature is confirmed, the controller 52 controls the energization quantity to the heating part 40 so that the temperature of the seating surface SF is substantially constant to the preset temperature. That is, the controller 52 controls to keep the temperature of the seating surface SF to the preset temperature after the temperature of the seating surface SF is increased to the preset temperature. Thereby, the toilet seat 10 at a suitable temperature can be provided to the user.

The controller 52 detects that the user leaves the toilet seat 10 on the basis of the detection results of the seating detection sensor 54, and in response to the detection, decreases the temperature of the seating surface SF from the preset temperature to the temperature in the stand-by state.

The controller 52 may perform, for example, a heat insulation operation mode keeping the temperature of the seating surface SF always to the preset temperature without limiting to the immediate warm operation mode. The controller 52 may be configured to switch multiple operation modes such as the immediate warm operation mode and the heat insulation operation mode, for example.

In this manner, the function part 50 has the toilet seat warming function warming the seating surface SF of the toilet seat 10. The function part 50 may have, for example, a sanitary washing function ejecting water (cold water or hot water) toward "bottom" or the like of the user seating on the toilet seat 10 and washing the "bottom" or the like of the user. Furthermore, the sanitary washing function may have various functions such as "warm air drying function" drying by blowing warm air toward the "bottom" or the like of the user seating on the toilet seat 10, "deodorizing function", and "indoor warming function". The function of the function part 50 is not limited to the above, and may be arbitrary function used in the toilet apparatus 2.

Figure 5:
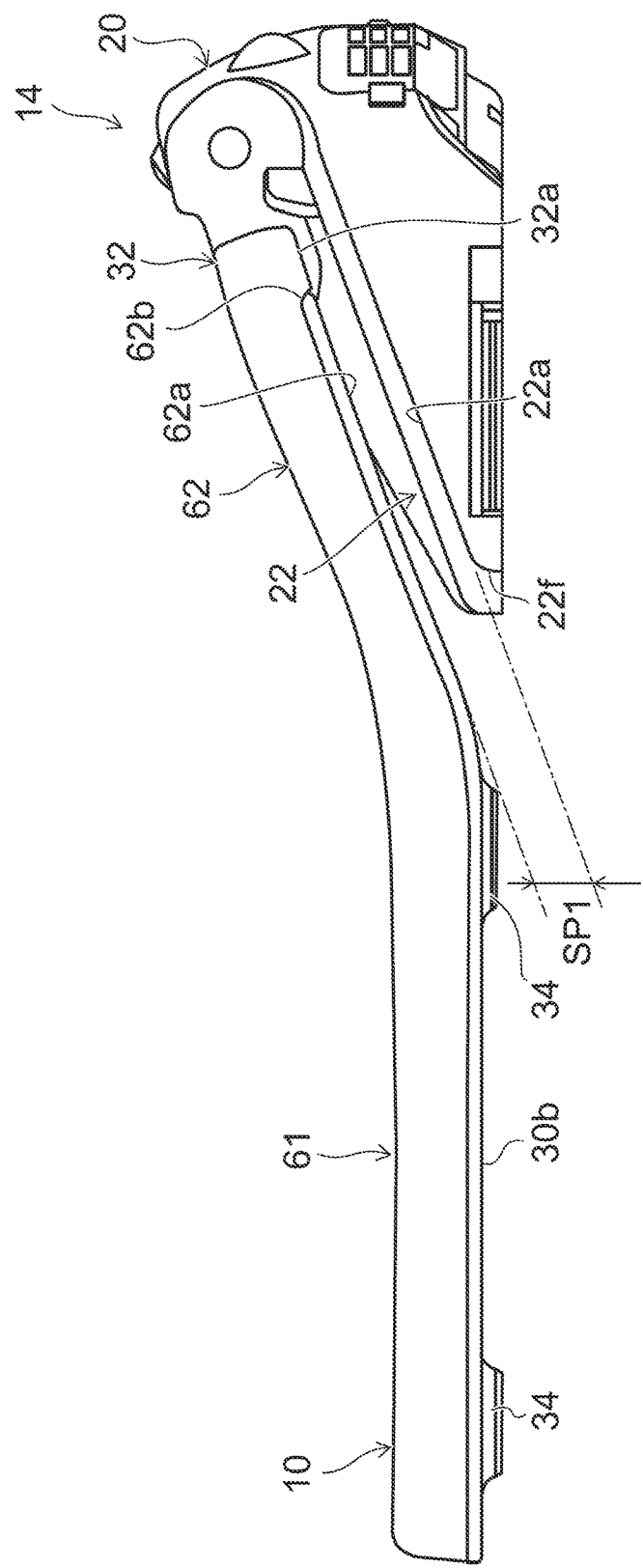
FIG. 5 is a side view showing a portion of the toilet apparatus according to the embodiment.

FIG. 5 is a side view showing a portion of the toilet apparatus according to the embodiment.

As shown in FIG. 5, the toilet seat main body 30 of the seat 10 includes a first portion 61 and a second portion 62. The first portion 61 is positioned forward the case cover 20 in the closed state. The second portion 62 rises toward backward from the first portion 61 in the closed state, and overlaps the extending portion 22. The hinge portions 31, 32 are provided at a rear end of the second portion 62. Thereby, the second portion 62 is pivotally supported on the cover case 20. In FIG. 5, the toilet bowl 6 and the toilet lid 12 are not shown conveniently.

A side face lower end 62a of the second portion 62 is generally parallel to a side face upper end 22a of the extending portion 22. In a state in which the toilet seat 10 and the main part 14 are viewed from the side, a space SP1 in the vertical direction formed between the side face lower end of the second portion 62 and the side face upper end 22a of the extending portion 22 is substantially constant along the front-back direction. Here, "the side face lower end 62a and the side face upper end 22a are generally parallel" is, for example, a state in which a deviation of a length of the gap SP1 is not more than 2 mm over a region where the side face lower end 62a opposes the side face upper end 22a in the vertical direction. More favorably, the deviation of the length of the gap SP1 is not more than 1 mm.

The extending portion 22 is descending and inclined continuously toward forward. The side face lower end 62a of the second portion 62 is generally parallel to the side face upper end 22a of the extending portion 22 from a rear end 62b of the second portion 62 to a front end 22f of the extending portion 22 in the closed state.

The side surface of the hinge portion 32 is quadrangle. The side surface of the hinge portion 32 is continued to the side surface of the second portion 62. A side face lower end 32a of the hinge portion 32 is generally parallel to the side face upper end 22a of the extending portion 22 in the closed state. "Quadrangle shape" includes, for example, a shape with rounded corners of the quadrangle and slightly curved sides of the quadrangle, and the like. Since the configuration of the hinge portion 31 is substantially the same as the configuration of the hinge portion 32, the detailed description will be omitted.

Figure 6:
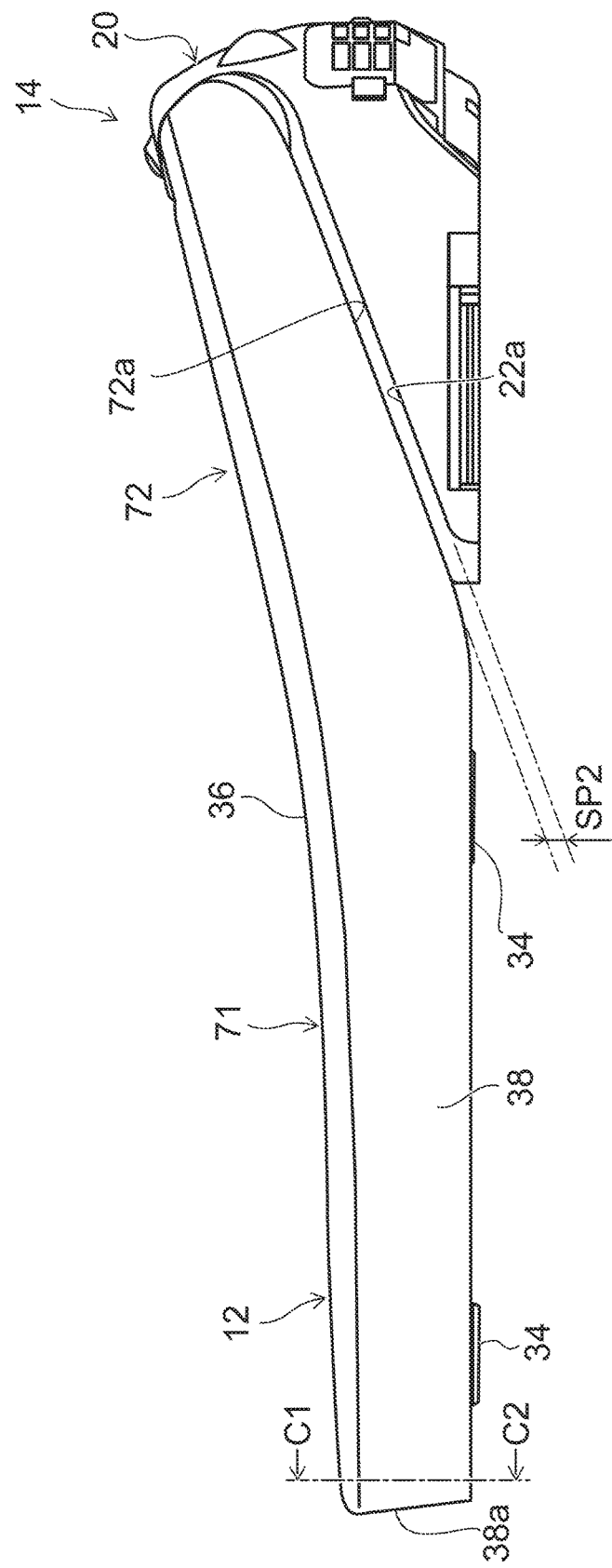
FIG. 6 is a side view showing a portion of the toilet apparatus according to the embodiment.

FIG. 6 is a side view showing a portion of the toilet apparatus according to the embodiment.

As shown in FIG. 6, the toiled lid 12 has a first region 71 and a second region 72. The first region 71 is positioned forward the cover case 20 in the closed state. The second region 72 rises toward backward from the first portion 61 in the closed state, overlaps the extending portion 22, and is pivotally supported on the cover case 20.

A width in the horizontal direction of the second region 72 of the toilet lid 12 is substantially the same as a width in the horizontal direction of the cover case 20. A side surface of the second region 72 of the toilet lid 12 forms a generally continuous surface to a side surface of the cover case 20 in the closed state. Thereby, the design of the toilet apparatus 2 in the state of the toilet lid 12 closed can be improved.

A side face lower end 72a of the second region 72 is generally parallel to the side face upper end 22a of the extending portion 22 in the closed state. In other words, the side face lower end 72a of the second region 72 is a lower end of the hanging portion 38 in the second region 72. In a state in which the toilet lid 12 and the main part 14 are viewed from the side, a space SP2 in the vertical direction formed between the side face lower end 72a of the second region 72 and the side face upper end 22a of the extending portion 22 is substantially constant along the front-back direction.

The gap SP2 is, for example, not less than 1 mm and not more than 5 mm. Thereby, for example, the design of the toilet apparatus 2 in the state of the toilet lid 12 closed can be improved while suppressing a lower end of the toilet lid 12 from abutting to the main part 14.

The lower end of the hanging portion 38 of the first region 71 is positioned downward the toilet seat main body 30 and upward a lower end of the buffer member 34 in the closed state. That is, in the state in which the toilet lid 12 is viewed from the side in the closed state, the hanging portion 38 covers the entire of the toilet seat main body 30.

A front end surface 38a of the hanging portion 38 changes in the closed state so as to recede toward downward. That is, the front end surface 38a of the hanging portion 38 is inclined in reversed tapered shape. The front end surface 38a of the hanging portion 38 may be inclined linearly and may be curved in a curved line.

Figure 7:
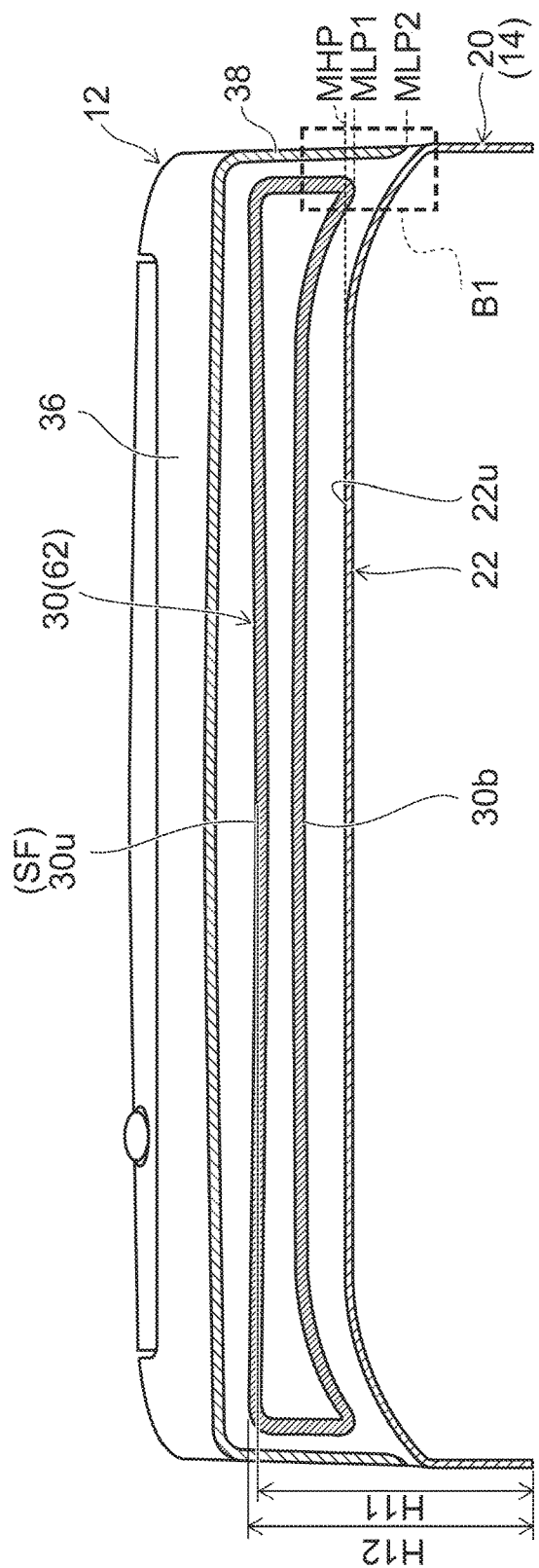
FIG. 7 is a cross-sectional view showing a portion of the toilet apparatus according to the embodiment.

FIG. 7 is a cross-sectional view showing a portion of the toilet apparatus according to the embodiment.

FIG. 7 shows A1-Ar line cross-section in FIG. 3.

As shown in FIG. 2 and FIG. 7, an upper end surface 22u of the extending portion 22 changes the height to lower toward forward and the height to lower toward the side. In other words, the upper end surface 22u of the extending portion 22 is descending and inclined gradually toward the side.

The lower end surface 30b of the second portion 62 of the toilet seat main body 30 changes the height to lower toward the side along the upper end surface 22u of the extending portion 22 in the closed state. The lower end surface 30b of the second portion 62 of the toilet seat main body 30 is descending and inclined gradually toward the side in the closed state.

The upper end surface 22u of the extending portion 22 has, for example, a convex curved surface shape. The lower end surface 30b of the second portion 62 of the toilet seat main body 30 has, for example, a convex curved surface shape. A curvature of the lower end surface 30b of the second portion 62 at the prescribed position is, for example, generally the same as a curvature of the upper end surface 22u of the extending portion 22 at a position opposing the prescribed position in the closed state. For example, the curvature of the lower end surface 30b of the second portion 62 at the prescribed position not less than 0.9 times and not less than 1.1 times the curvature of the upper end surface 22u of the extending portion 22 at the position opposing the prescribed position in the closed state. In other words, the lower end surface 30b of the second portion 62 is generally parallel to the upper end surface 22u of the extending portion 22 in the cross-section orthogonal to the front-back direction.

The upper end surface 22u of the extending portion 22 is, for example, not limited to the convex curved surface and may be inclined linearly. Similarly, the lower end surface 30b of the second portion 62 of the toilet seat main body 30 is not limited to the convex curved surface and may be inclined linearly.

As shown in FIG. 7, in the cross-section orthogonal to the front-back direction, the lowest point MLP1 of the lower end surface 30b of the toilet seat 10 in the closed state is positioned downward the highest point MHP of the upper end surface 22u of the extending portion 22. The lowest point MLP1 of the lower end surface 30b of the toilet seat 10 in the closed state overlaps the extending portion 22 when viewed from the side.

In the cross-section orthogonal to the front-back direction, the lowest point MLP2 of the hanging portion 38 of the toilet lid 12 in the closed state is positioned downward the highest point MHP of the upper end surface 22u of the extending portion 22. The lowest point MLP2 of the hanging portion 38 of the toilet lid 12 in the closed state overlaps the extending portion 22 when viewed from the side.

A change ratio of the height of a center portion in the horizontal direction of the upper end surface 22u of the extending portion 22 is smaller than a change ratio of the height of a side end portion of the upper end surface 22u of the extending portion 22. The center portion of the upper end surface 22u is planar and more inclined toward the side.

A change ratio of the height of a center portion of the lower end surface 30b of the second portion 62 of the toilet seat main body 30 is smaller than a change ratio of the height of the side end portion of the lower end surface 30b of the second portion 62. The center portion of the lower end surface 30b of the second portion 62 extends in the horizontal direction to be planar, and is more inclined toward the side.

As shown in FIG. 7, in the cross-section orthogonal to the front-back direction, a height H11 of a center portion of an upper end surface 30u (seating surface SF) of the second portion 62 of the toilet seat main body 30 is lower than a height H12 of a side end portion of the upper surface end 30u of the second portion 62 of the toilet seat main body 30. The upper end surface 30u of the second portion 62 of the toilet seat main body 30 has, for example, a concave curved surface shape.

Figure 8:
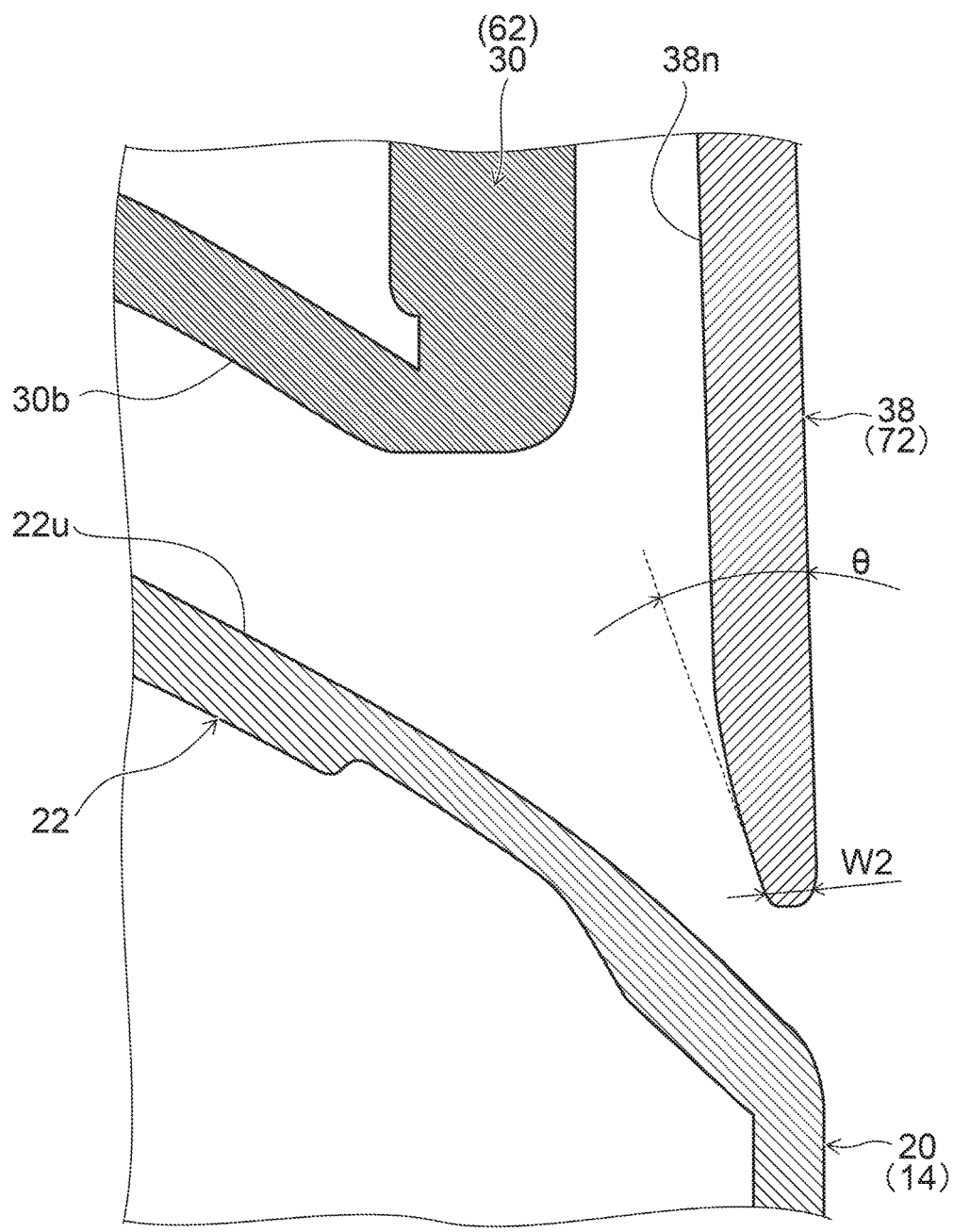
FIG. 8 is a cross-sectional view showing a portion of the toilet apparatus according to the embodiment.

FIG. 8 is a cross-sectional view showing a portion of the toilet apparatus according to the embodiment.

FIG. 8 shows an enlarged region B1 surrounded by a broken line in FIG. 7.

As shown in FIG. 8, a lower end portion of an inside surface 38n of the hanging portion 38 of the toilet lid 12 changes so as to spread outside toward downward in the second region 72. The lower end portion of the hanging portion 38 is formed in a tapered shape by making the inside surface 38n inclined toward the outside. The lower end portion of the hanging portion 38 of the second region 72 is thin toward downward.

The inside surface 38n of the hanging portion 38 may be linearly inclined and may be curved in a curved line. An inclination angle θ of the inside surface 38n of the hanging portion 38 is, for example, not less than 10° and not more than 30° approximately. The inclination angle θ is not limited to the above and may be an arbitrary angle.

Figure 9:
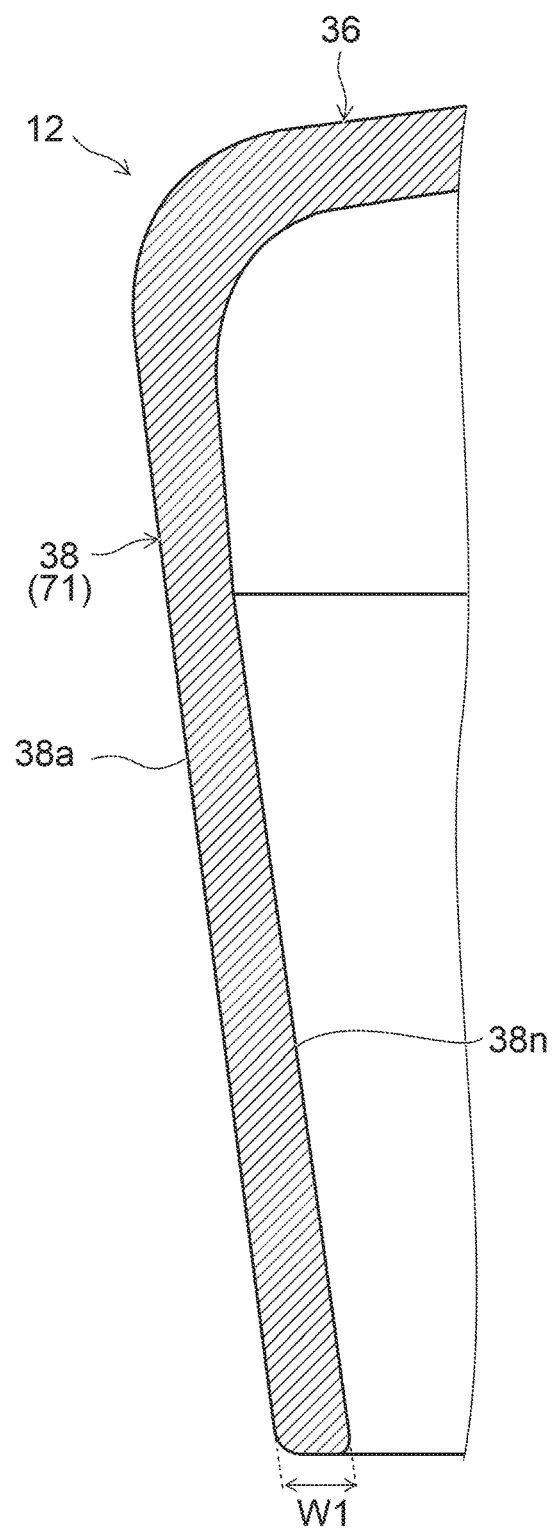
FIG. 9 is a cross-sectional view showing a portion of the toilet apparatus according to the embodiment.

FIG. 9 is a cross-sectional view showing a portion of the toilet apparatus according to the embodiment.

FIG. 9 shows C1-C2 line cross-section in FIG. 6.

As shown in FIG. 9, the hanging portion 38 of the toilet lid 12 does not have a tapered shape in the first region 71. The hanging portion 38 in the first region 71 has substantially the same thickness from an upper end portion to a lower end portion. The inside surface 38n of the hanging portion 38 extends generally linearly from the upper end portion to the lower end portion. Therefore, a width W1 of the lower end of the hanging portion 38 in the first region 71 is wider than a width W2 (see FIG. 8) of the lower end of the hanging portion 38 in the second region 72.

Without limitation the above, the tapered shape may be formed at the lower end portion of the hanging portion 38 in the first region 71. In the first region 71, the lower end portion of the inside surface 38n of the hanging portion 38 may be changed so as to spread outside toward downward. That is, the entire of the lower end portion of the hanging portion 38 of the toilet lid 12 may be formed in a tapered shape.

Figure 10:
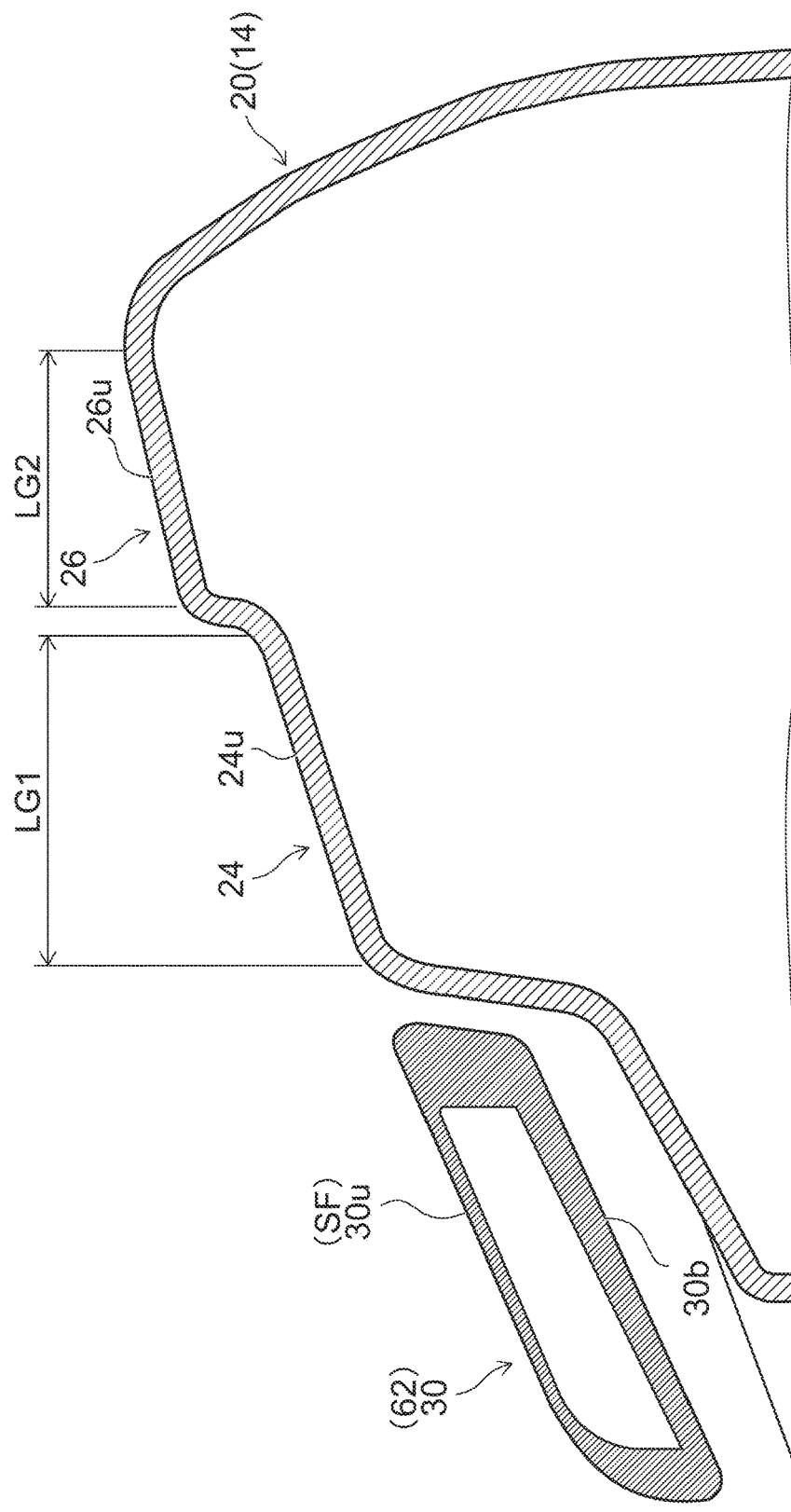
FIG. 10 is a cross-sectional view showing a portion of the toilet apparatus according to the embodiment.

FIG. 10 is a cross-sectional view showing a portion of the toilet apparatus according to the embodiment.

FIG. 10 shows D1-D2 line cross-section in FIG. 1.

As shown in FIG. 10, a height of an upper end surface 24u of the toilet seat pivot support portion 24 becomes low toward forward. The upper end surface 24u of the toilet seat pivot support portion 24 is continuously descending and inclined toward forward.

A height of an upper end surface 26u of the toilet lid pivot support portion 26 becomes low toward forward. The upper end surface 26u of the toilet lid pivot support portion 26 is, for example, generally parallel to the upper end surface 24u of the toilet seat pivot support portion 24. A length LG1 in the front-back direction of the upper end surface 24u of the toilet seat pivot support portion 24 is longer than a length LG2 in the front-back direction of the upper end surface 26u of the toilet lid pivot support portion 26.

Figure 11:
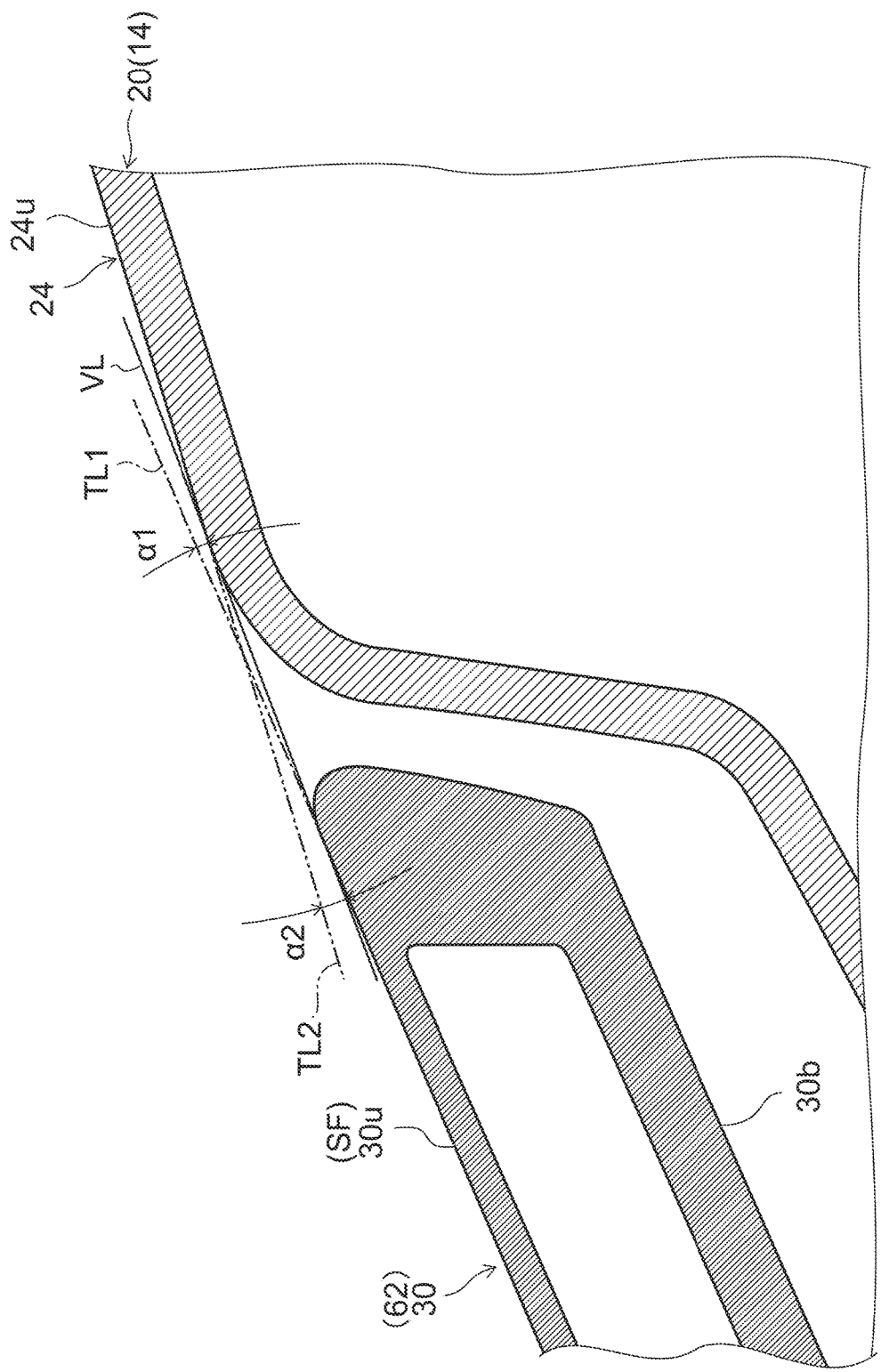
FIG. 11 is a cross-sectional view showing a portion of the toilet apparatus according to the embodiment.

FIG. 11 is a cross-sectional view showing a portion of the toilet apparatus according to the embodiment.

FIG. 11 shows enlarged portions related to the toilet seat main body 30 and the toilet seat pivot support portion 24 in FIG. 10.

As shown in FIG. 10 and FIG. 11, the upper end surface 24u of the toilet seat pivot support portion 24 forms a generally continuous surface to the upper end surface 30u (seating surface SF) of the second portion 62 of the toilet seat main body 30. A height change of a forefront of the upper end surface 24u of the toilet seat pivot support portion 24 in the horizontal direction is generally the same as a height change of a rear end of the upper end surface 30u of the second portion 62 in the horizontal direction (e.g. see FIG. 1). In other words, the forefront of the upper end surface 24u of the toilet seat pivot support portion 24 is generally parallel to the rear end of the upper end surface 30u of the second portion 62. The height change of the forefront of the upper end surface 24u of the toilet seat pivot support portion 24 in the horizontal direction and the height change of the rear end of the upper end surface 30u of the second portion 62 in the horizontal direction are, for example, generally horizontal.

Here, "generally continuous surface" refers to a state in which, for example, in the cross-section orthogonal to the horizontal direction, an angle α1 between a virtual line VVL and a tangent line TL1 is not more than 5°, and an angle α2 between the virtual line VL and a tangent line TL2 is not more than 5°. The virtual line VL is a virtual line connecting the rear end of the upper end surface 30u of the toilet seat main body 30 to the front end of the upper end surface 24u of the toilet seat pivot support portion 24 in the cross-section orthogonal to the horizontal direction. The tangent line TL1 is a tangent line to the rear end portion of the upper end surface 30u of the toilet seat main body 30 in the cross-section orthogonal to the horizontal direction. The tangent line TL2 is a tangent line to the front end portion of the upper end surface 24u of the toilet seat pivot support portion 24 in the cross-section orthogonal to the horizontal direction.

Figure 12A:
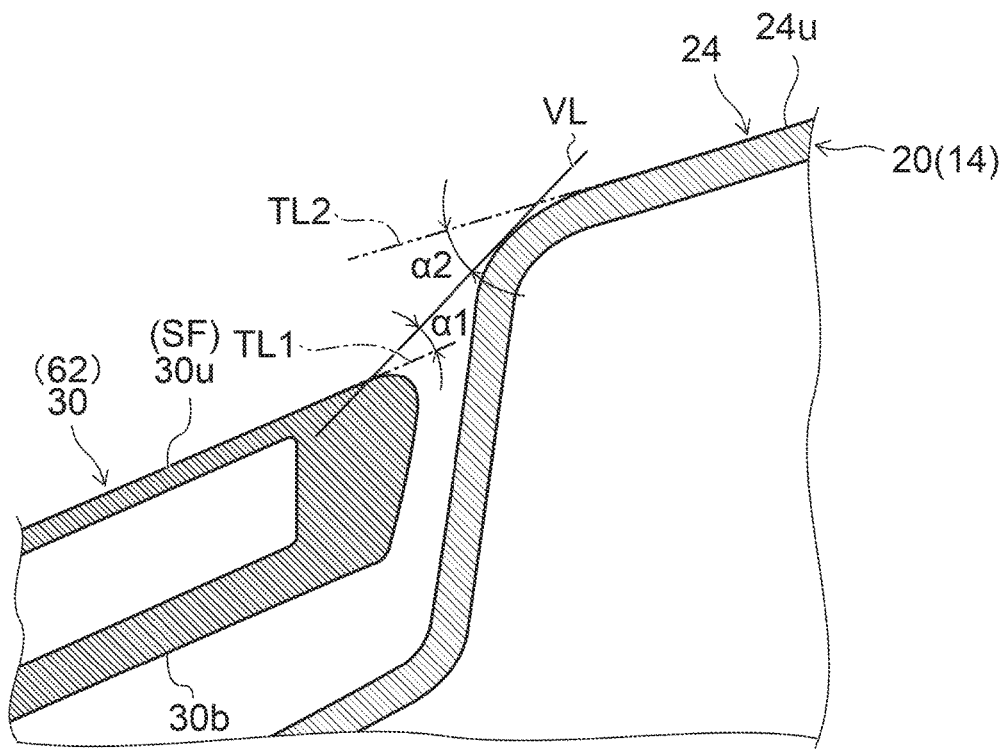
FIG. 12A and FIG. 12B are partial cross-sectional views showing a reference example.
Figure 12B:
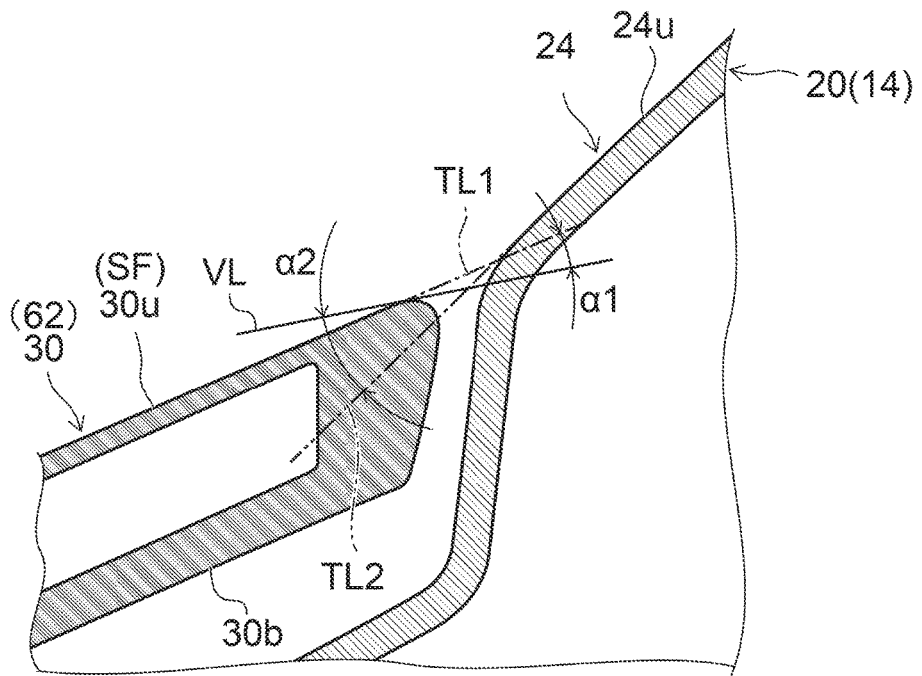

FIG. 12A and FIG. 12B are cross-sectional views showing a reference example.

As shown in FIG. 12A, in a case where a large step is formed between the upper end surface 30u of the toilet seat main body 30 and the upper end surface 24u of the toilet seat pivot support portion 24, at least one of the angles α1 and α2 is larger than 5°. Similarly, as shown in FIG. 12B, also in a case where the inclination angle of the upper end surface 30u of the toilet seat main body 30 is largely different from the inclination angle of the upper end surface 24u of the toilet seat pivot support portion 24, at least one of the angles α1 and α2 is larger than 5°. An angle between the tangent line TL1 and the horizontal plane is set to be 18.5°, and an angle between the tangent line TL2 and the horizontal plane is set to be 23.5°. An angle between the tangent line TL2 and the horizontal plane is set in a range from 22° to 40°.

In this manner, the angle α1 between the virtual line VL and the tangent line TL1 is set to be not more than 5°, and the angle α2 between the virtual line VL and the tangent line TL2 is set to be not more than 5°. Thereby, the upper end surface 30u of the toilet seat main body 30 and the upper end surface 24u of the toilet seat pivot support portion 24 can be recognized as the generally continuous surface. The respective angles are set in a convex direction with the inflection point as the center, and an angle difference is desired to be not more than 10° and furthermore desired to be not more than 5°. If in the convex direction, the user is unlikely to touch the case cover 20, and thus comfortability is preserved (since not being warmed by the heater, the possibility of touching the cold case cover 20 decreases). If in the concave direction, the user touches both of the toilet seat 10 and the case cover 20, and perceives easily.

Figure 13:
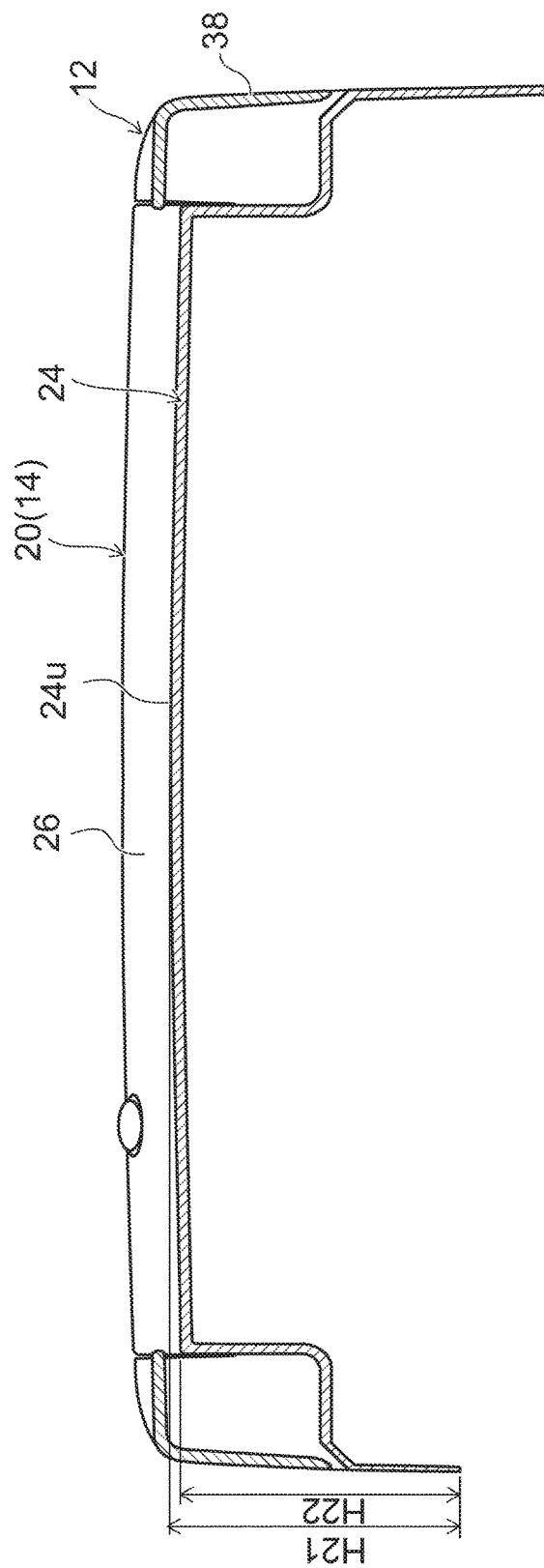
FIG. 13 is a cross-sectional view showing a portion of the toilet apparatus according to the embodiment.

FIG. 13 is a cross-sectional view showing a portion of the toilet apparatus according to the embodiment.

FIG. 13 shows E1-E2 cross-section in FIG. 3.

As described with respect to FIG. 7, in the cross-section orthogonal to the front-back direction, the height H11 of the center portion of the upper end surface 30u (seating surface SF) of the second portion 62 of the toilet seat main body 30 is lower than the height H12 of the side end portion of the upper surface end 30u of the second portion 62 of the toilet seat main body 30.

On the other hand, as shown in FIG. 13, in the cross-section orthogonal to the front-back direction, a height H21 of a center portion of the upper end surface 24u of the toilet seat pivot support portion 24 is higher than a height H22 of a side end portion of the upper end surface 24u of the toilet seat pivot support portion 24. The upper end surface 24u of the toilet seat pivot support portion 24 has, for example, a convex curved surface shape.

In this manner, the change amount increasing toward backward of the center portion of the upper end surface 24u of the toilet seat pivot support portion 24 is larger than the change amount increasing toward backward of the side end portion of the upper end surface 24u of the toilet seat pivot support portion 24. The change amount decreasing toward forward of a center portion of the upper end surface 30u of the second portion 62 is larger than the change amount decreasing toward forward of a side end portion of the upper end surface 30u of the second portion 62.

Figure 14:
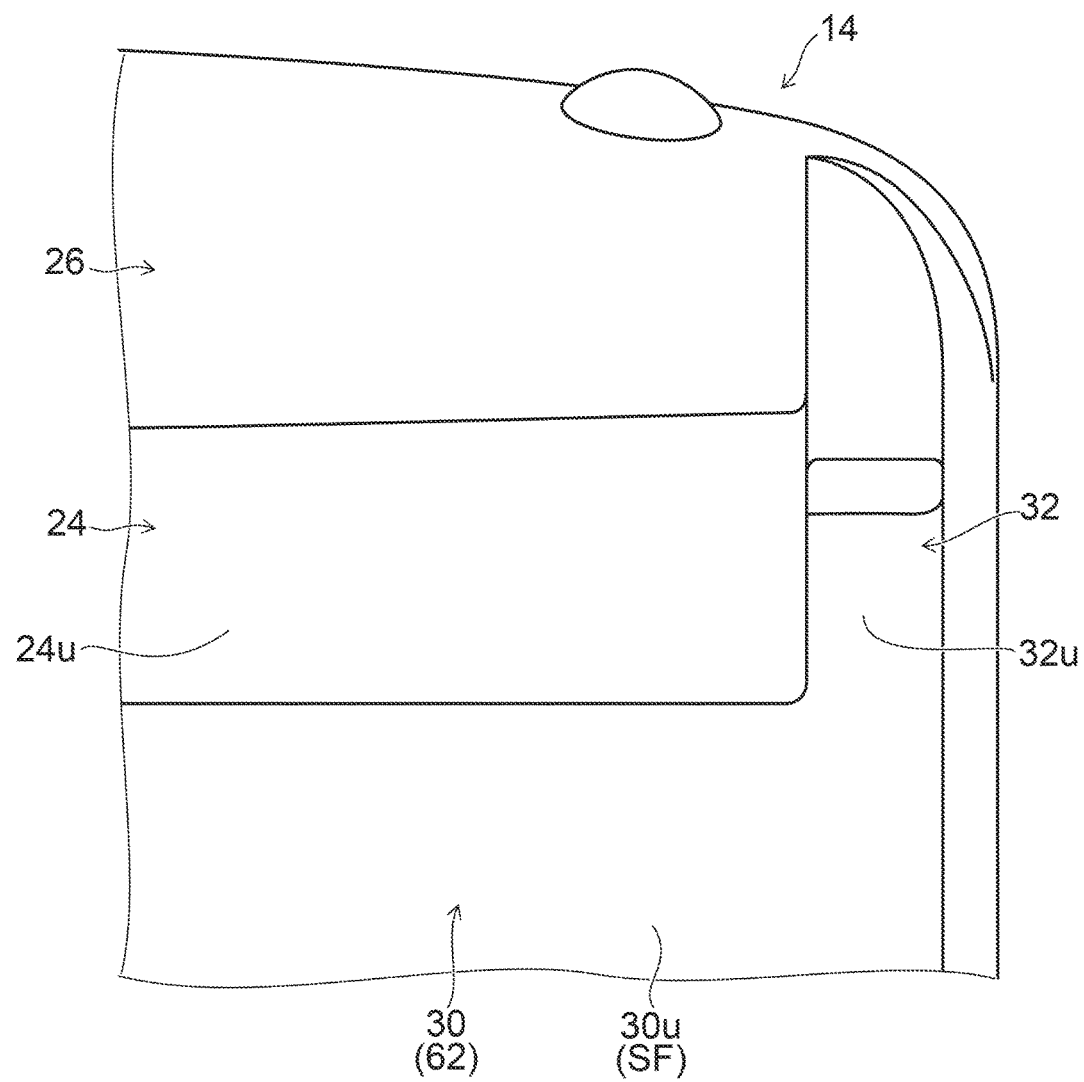
FIG. 14 is a plan view showing a portion of the toilet apparatus according to the embodiment.

FIG. 14 is a plan view showing a portion of the toilet apparatus according to the embodiment.

As shown in FIG. 14, in the top view, an upper end surface 32u of the hinge portion 32 is quadrangle. The upper end surface 32u of the hinge portion 32 forms a generally continuous surface to the upper end surface 30u of the second portion 62 of the toilet seat main body 30 and the upper end surface 24u of the toilet seat pivot support portion 24. The upper end surface 32u of the hinge portion 32 is, for example, continuous to the upper end surface 30u of the toilet seat main body 30.

The shape of the upper end surface 32u of the hinge portion 32 is not limited to be quadrangle, and may be an arbitrary shape. Since the configuration of the hinge portion 31 is substantially the same as the configuration of the hinge portion 32, the detailed description will be omitted. "Quadrangle" and "generally continuous surface" are defined similarly as described above.

As described above, according to the toilet apparatus 2 according to the embodiment, by making the side face lower end 62a of the second portion 62 generally parallel to the side face upper end 22a of the extending portion 22 in the closed state, the design can be improved compared with the case where the gap between the toilet seat 10 and the case cover 20 is non-uniform. The toilet apparatus 2 having a favorable design can be provided. If the gap is generally constant, compared with the case of being non-uniform, the side surface of the second portion 62 and the side surface of the extending portion 22 can be easy to be wiped, and the cleanliness can be improved as well.

The extending portion 22 is caused to be descending and inclined toward forward, and the side face lower end 52a of the second portion 62 is made generally parallel to the side face upper end 22a of the extending portion 22 from the rear end of the second portion 62 to the front end of the extending portion 22 in the closed state, and thus the gap formed between the front end of the extending portion 22 and the toilet seat 10 can be suppressed and the design of the toilet apparatus 2 can be more improved.

The side surfaces of the hinge portions 31, 32 are made quadrangle, and continuous to the side surface of the second portion 62, and are made generally parallel to the side end upper end 22a of the extending portion 22 in the closed state, and thus the gap formed between the hinge portions 31, 32 and the case cover 20 can be suppressed and the design of the toilet apparatus 2 can be more improved.

The side face lower end 72a of the second region 72 is made generally parallel to the side face upper end 22a of the extending portion 22 in the closed state, and thus the design of the toilet apparatus 2 in a state of the toilet lid 12 closed can be improved.

In the toilet apparatus 2, the upper end surface 22u of the extending portion 22 is changed so as to lower the height toward forward and to lower the height toward the side. The lower end surface 30b of the second portion 62 of the toilet seat main body 30 is changed along the upper end surface 22u of the extending portion 22 so as to lower the height toward the side. Even if cold air enters between the lower end surface 30b of the toilet seat main body 30 and the upper end surface 22u of the extending portion 22, the cold air tends to go downward, and thus the cold air can be easily exhausted to the outside along the slope of the lower end surface 30b of the toilet seat main body 30 and the slope of the upper end surface 22u of the extending portion 22. Therefore, when the seating surface SF is heated, the temperature of the seating surface SF can be suppressed from decreasing. The toilet apparatus 2 having the temperature of the seating surface SF suppressed from decreasing can be provided. The noise and scratch due to contact between the case cover 20 and the toilet seat 10 can be suppressed as well.

The upper end surface 22u of the extending portion 22 is gently descending and inclined toward the side, and thus the upper end surface 22u can be easily wiped compared with the case of the upper end surface 22u having a step, and the like. The cleanliness of the toilet apparatus 2 can be improved as well.

By making the curvature of the prescribed position of the lower end surface 30b of the second portion 62 generally the same as the curvature of the upper end surface 22u of the extending portion 22 at the position opposing the prescribed position in the closed state, the cold air which enters between the lower end surface 30b of the toilet seat main body 30 and the upper end surface 22u of the extending portion 22 can be more easily exhausted to the outside. The temperature of the seating surface SF can be suppressed more from decreasing.

In the cross-section orthogonal to the front-back direction, by causing the lowest point of the lower end surface 30b of the toilet seat 10 in the closed state to position downward the highest point of the upper end surface 22u of the extending portion 22, the cold air can be suppressed from entering between the lower end surface 30b of the toilet seat main body 30 and the upper end surface 22u of the extending portion 22. The temperature of the seating surface SF can be suppressed more from decreasing. When viewing the main part 14 and the toilet seat 10 from the side, the gap is not seen and the design of the toilet apparatus 2 can be improved.

The change ratio of the height of the center portion of the upper end surface 22u of the extending portion 22 is made smaller than the change ratio of the height of the side end portion of the upper end surface 22u of the extending portion 22, and the change ratio of the height of the center portion of the lower end surface 30b of the second portion 62 of the toilet seat main body 30 is made smaller than the change ratio of the height of the side end portion of the lower end surface 30b of the second portion 62. Thereby, compared with the case where the lower end surface 30b of the toilet seat main body 30 changes at the same change ratio from the side end portion to the center portion, the side face portion of the toilet seat 10 which needs strength can be reinforced, and the center portion of the toilet seat 10 which does not need much strength can be thinned. Therefore, while suppressing the temperature of the seating surface SF from decreasing, the toilet apparatus 2 can be suppressed from increasing in size.

In the toilet apparatus 2, the upper end surface 24u of the toilet seat pivot support portion 24 forms a generally continuous surface to the upper end surface 30u of the second portion 62. Thereby, even if the user sits deeply on the toilet seat 10, the user can be suppressed from receiving feeling of dislike. Due to the portion of the upper end surface 24u of the toilet seat pivot support portion 24, impression of broadening the seating surface SF is produced and the user can receive feeling of security. Compared with the case where the upper end surface 24u of the toilet seat pivot support portion 24 is discontinuous to the upper end surface 30u of the second portion 62, the design of the toilet apparatus 2 can be improved. The toilet apparatus 2 having favorable usability can be provided.

By making the center portion of the upper end surface 30u of the second portion 62 lower than the side end portion of the upper end surface 30u of the second portion 62, the shape of the upper end surface 30u of the second portion 62 can be fit to the shape of buttocks of the human body, and comfort to sit on can be improved. By making the center portion of the upper end surface 24u of the toilet seat pivot support portion 24 higher than the side end portion of the upper end surface 24u of the toilet seat pivot support portion 24, when the buttocks of the user touch the upper end surface 24u of the toilet seat pivot support portion 24, while suppressing feeling of dislike, it is possible to make the user notice sitting on the case cover 20. While suppressing the user from receiving feeling of dislike, it is possible to guide the user to an adequate position of the toilet seat 10.

By making the length in the front-back direction of the upper end surface 24u of the toilet seat pivot support portion 24 longer than the length in the front-back direction of the upper end surface 26u of the toilet lid pivot support portion 26, even when the user sits deeply on the toilet seat 10, it is possible to suppress more the user from receiving feeling of dislike. The design of the toilet apparatus 2 can be improved by showing the case cover 20 and the toilet seat 10 together.

By making the shape of the upper end surfaces of the hinge portions 31, 32 quadrangle and forming a generally continuous surface between the upper end surface 30u of the second region 62 and the upper end surface 24u of the toilet seat pivot support portion 24, it is possible to show the case cover 20 and the toilet seat 10 together and the design of the toilet apparatus 2 can be improved.

In the toilet apparatus 2, the lower end portion of the inside surface 38n of the hanging portion 38 changes so as to broaden to the outside toward downward. Thereby, when the lower end of the hanging portion 38 abuts the case cover 20, the lower end of the hanging portion 38 broadens to the outside and it is possible to escape the force applied to the case cover 20 to the outside. Therefore, without design declining, also in the case where the user sits on the toilet lid 12, it is possible to suppress scratches and breakages of the main part 14 and to obtain high reliability.

Since the upper end surface 22u of the extending portion 22 changes so as to lower the height toward the side, and thus when the lower end of the hanging portion 38 abuts the case cover 20, the lower end of the hanging portion 38 can be easily broadened to the outside. It is possible to suppress scratches and breakages of the main part 14 more.

In the cross-section orthogonal to the front-back direction, the lowest point of the hanging portion 38 of the toilet lid 12 in the closed state is positioned at a position downward the highest point of the upper end surface 22u of the extending portion 22, therefore, when viewing the main part 14 and the toilet lid 12 from the side, the gap is not seen and the design of the toilet apparatus 2 can be improved.

By making the width of the lower end of the first region 71 of the toilet lid 12 wider than the width of the lower end of the second region 72, when opening/closing the toilet lid 12 manually, it is possible to make it easy to hold the lower end of the first region 71. When the lower end of the first region 71 abuts the toilet bowl 6 or the like, scratches and breakages of the toilet bowl 6 and the toilet lid 12 can be suppressed.

The lower end of the hanging portion 38 is positioned at the position downward the toilet seat main body 30 and upward the lower end of the buffer member 34, and thus visual recognition of the toilet seat main body 30 is suppressed when viewing from the side and the design of the toilet apparatus 2 can be improved. While improving the design, the toilet lid 12 can be suppressed from abutting the toilet bowl 6. Since air flow from the gap between the toilet seat main body 30 and the upper end of the toilet bowl 6 can be suppressed, in the case of the toilet bowl 6 having the warming function, the heat insulation of the toilet seat 10 is improved and energy saving of the toilet apparatus 2 is obtained.

Since the front end surface 38a of the hanging portion 38 changes in the closed state so as to recede toward downward, also in the case where the lower end of the hanging portion 38 is extended downward the toilet seat main body 30, it is possible to hold a hand on the front end surface 38a of the hanging portion 38 easily and to open/close manually the toilet lid 12 easily.

Hereinabove, the embodiments of the invention are described. However, the invention is not limited to the descriptions. Design modification appropriately made by a person skilled in the art in regard to the embodiments described above is within the scope of the invention to the extent that the features of the invention are included. For example, the shape, the dimension, the material, the disposition or the like of the components included in the toilet apparatus 2 or the like are not limited to illustrations and can be changed appropriately.

Further, any two or more components of the embodiments may be combined within the extent of technical feasibility and are included in the scope of the invention to the extent that the purport of the invention is included.

What is claimed is:

1. A toilet apparatus comprising:
a main part including a function part, and a case cover covering the function part, the main part being attached on a toilet bowl; and
a toilet seat attached rotatably to the case cover, the toilet seat shifting between a closed state and an open state, in the closed state a user being capable of seating upward the toilet bowl, in the open state an upper surface of the toilet bowl being exposed,
the case cover including an extending portion, a height of the extending portion becoming low toward in a front direction,
the toilet seat including
a toilet seat main body including a first portion and a second portion, the first portion being positioned forward the case cover in the closed state, the second portion rising backward from the first portion in the closed state, overlapping the extending portion, and being pivotally supported to the case cover, and
a heating part incorporated in the toilet seat main body, and heating a seating surface of the toilet seat main body,
the extending portion having an upper end surface, a height of the upper end surface of the extending portion becoming low toward in the front direction and becoming low toward in a horizontal direction, the horizontal direction being perpendicular to the front direction and a vertical direction,
the second portion of the toilet seat main body having a lower end surface, a height of the lower end surface of the second portion becoming low toward in the horizontal direction along the upper end surface of the extending portion in the closed state.

2. The toilet apparatus according to claim 1, wherein
the upper end surface of the extending portion has a convex curved surface shape,
the lower end surface of the second portion of the toilet seat main body has a concave curved surface shape, and
a curvature of the lower end surface of the second portion at a prescribed position is generally same as a curvature of the upper end surface of the extending portion at a position opposing the prescribed position in the closed state.

3. The toilet apparatus according to claim 1, wherein
in a cross-section orthogonal to a front-back direction, a lowest point of the lower end surface of the toilet seat in the closed state is positioned downward a highest point of the upper end surface of the extending portion.

4. The toilet apparatus according to claim 1, wherein
a change ratio of a height of a center portion of the upper end surface of the extending portion is smaller than a curvature of a height of a side end portion of the upper end surface of the extending portion, and
a change ratio of a height of a center portion of the lower end surface of the second portion of the toilet seat main body is smaller than a curvature of a height of a side end portion of the lower end surface of the second portion.

5. The toilet apparatus according to claim 1, wherein
a side face lower end of the second portion is generally parallel to a side face upper end of the extending portion in the closed state.

* * * * *